United States Patent [19]

Matono

[11] Patent Number: 5,056,353
[45] Date of Patent: Oct. 15, 1991

[54] MARKER FOR DETECTING AMOUNT OF WORKING AND PROCESS FOR PRODUCING THIN FILM MAGNETIC HEAD

[75] Inventor: Naoto Matono, Yawata, Japan

[73] Assignee: Sanyo Electric Co., Ltd., Moriguchi, Japan

[21] Appl. No.: 333,400

[22] Filed: Apr. 5, 1989

[30] Foreign Application Priority Data

Apr. 6, 1988 [JP] Japan .................................. 63-84436
Nov. 16, 1988 [JP] Japan ................................ 63-291823

[51] Int. Cl.⁵ .............................................. G01N 3/50
[52] U.S. Cl. ............................................ 73/7; 29/603
[58] Field of Search ................. 73/7, 865, 8; 116/208, 116/71; 29/603

[56] References Cited

U.S. PATENT DOCUMENTS 4,729,161  3/1988  Verbunt et al. ...................... 29/603

FOREIGN PATENT DOCUMENTS

58-177517  4/1982  Japan .
61-267913  5/1985  Japan .
62022220   7/1985  Japan .
62-232718  4/1986  Japan .
62-22219   1/1987  Japan .

Primary Examiner—Robert Raevis
Attorney, Agent, or Firm—Armstrong, Nikaido, Marmelstein, Kobovcik & Murray

[57] ABSTRACT

A working amount detecting marker formed by laminating first and second marker layers each having a predetermined shape when seen from above. Two sides contouring the respective marker layers intersect each other at a point located at a specified position where working is to be completed. When the portion of a magnetic head to be opposed to magnetic recording media is formed by grinding or grooving, the sectional configuration appears on the ground surface, indicating whether the amount of grinding or grooving is insufficient or excessive. The point of intersection, when appearing on the ground surface, readily indicates completion of grinding or grooving with high accuracy.

4 Claims, 6 Drawing Sheets

MARKER FOR DETECTING AMOUNT OF WORKING AND PROCESS FOR PRODUCING THIN FILM MAGNETIC HEAD

FIELD OF THE INVENTION

The present invention relates to the construction of thin film magnetic heads suited to high-density magnetic recording or reproduction, and more particularly to markers for detecting the amount of working performed grinding or lapping a specified portion of a magnetic head workpiece to form the portion of a magnetic head to be opposed to magnetic recording media, magnetic heads bearing such markers, and a process for producing magnetic heads utilizing such markers.

BACKGROUND OF THE INVENTION

Thin film magnetic heads comprise thin films providing a magnetic circuit, conductor coils, electrodes, etc. and formed in layers on a substrate with an insulating layer interposed between the adjacent layers. These heads are fabricated by thin film forming techniques such as vacuum evaporation, sputtering and photolithography and have the advantage that they can be compacted and given an increased density more easily than conventional bulk-type magnetic heads.

However, since the thin film magnetic head is much smaller than the bulk-type magnetic head in the depth of the magnetic gap, i.e., the dimension thereof (gap depth) in a direction perpendicular to the surface of the magnetic recording medium, the portion of the head to be opposed to the medium must be formed by lapping with high accuracy, for example of not greater than 1 $\mu$m in error.

Figure 12:
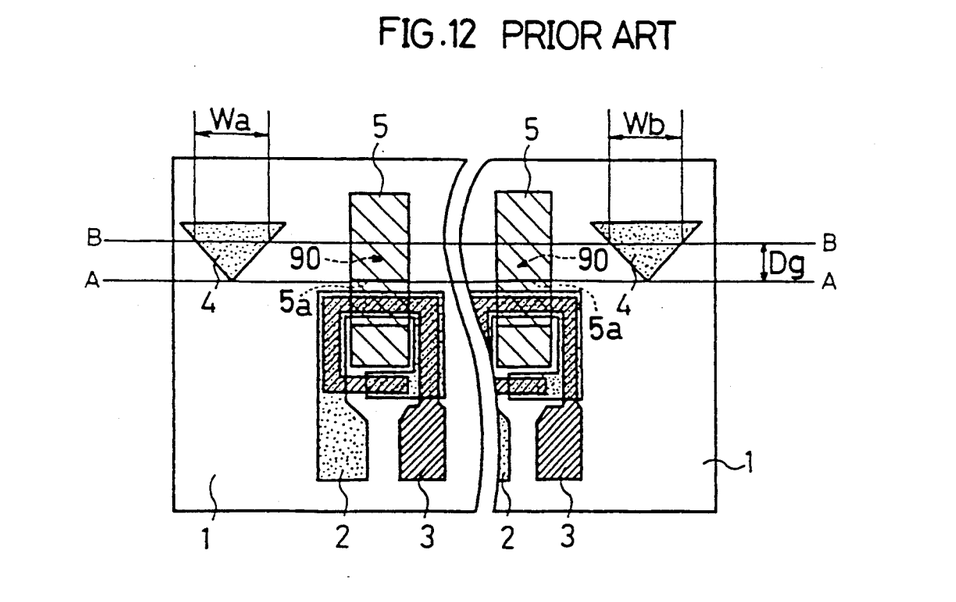
FIG. 12 is a plan view showing a thin film magnetic head workpiece provided with conventional markers.

Accordingly, Examined Japanese Utility Model Publication SHO 62-35133 proposes, as seen in FIG. 12, a pair of markers 4, 4 in the form of a thin film and provided on the upper surface of a substrate 1 having magnetic cores 5, coil conductors 2, 3, etc. for use in detecting the amount of working performed to produce a magnetic head.

The two markers 4, 4 are each in the form of a rectangular equilateral triangle. The vertex of the triangle is positioned on a line A—A through the positions 5a, 5a of inner ends of the respective magnetic gaps 90. The base of the triangle intersects the direction of progress of working at right angles therewith.

When the workpiece has been lapped, for example, to the position of the line B—B shown in the process for producing the magnetic head, the current gap depth Dg can be calculated by measuring the widths Wa, Wb of the two marker films and utilizing the similarity of triangles of the markers. If there is a difference between the two measurements Wa and Wb, the difference indicates the angle of inclination of the worked surface with respect to the line A—A.

In producing the thin film magnetic head by the above process, the gap depth is calculated only from the measurements of the marker widths Wa, Wb, and the lapping operation is discontinued when a predetermined gap depth is obtained, so that when the triangle of the marker fails to retain its shape, for example, owing to chipping or plastic deformation during lapping, the proportional relationship between the gap depth and the measurements of the widths Wa, Wb is lost, producing a great error in the gap depth on completion of lapping.

Many markers may be provided to overcome this problem, but the magnetic head will then become large-sized.

On the other hand, Unexamined Japanese Patent Publication SHO 62-232718 proposes a thin film magnetic head wherein a pair of markers positioned one above the other are formed on the substrate and so adapted that the gap depth can be calculated by measuring the width of one of the marker films appearing on the lapped surface. Nevertheless, the proposal has the drawback that it is impossible to recognize the amount remaining to be lapped during lapping.

SUMMARY OF THE INVENTION

An object of the present invention is to provide a working amount detecting marker which, even if somewhat deformed during working, indicates an amount of working for the operator to easily and accurately recognize that the amount has not reached, or has reached or has exceeded the specified amount, and a process for producing thin film magnetic heads with use of the marker.

Another object of the invention is to provide a detecting marker enabling the operator to accurately measure the amount remaining to be worked or an excessive amount of working, and a process for producing thin film magnetic heads with use of the marker.

The present invention provides a marker for detecting an amount of working for use in producing a thin film magnetic head. The marker comprises two thin films superposed in layers on the upper surface of a substrate and each in the form of a polygon in a plan view. When seen in a plan view, the contours of the respective thin films intersect each other at at least one side of the polygon. Of the two intersecting sides, at least one side is inclined at a predetermined angle with respect to the direction of progress of working. The point of intersection of the two sides is located at the specified position where the contemplated working is to be completed.

In producing a magnetic head with use of the detecting marker, the portion of the head to be opposed to magnetic recording media is formed by lapping the workpiece while observing the configuration of the end face of the marker appearing on the lapped surface.

The presence or absence of an overlapping between the two marker layers appearing on the ground surface visually indicates whether the workpiece has not been lapped to the specified position or has been lapped beyond the specified position. Further by measuring the width of at least one marker layer having the side inclined with respect to the direction of progress of lapping, the current gap depth formed or the amount remaining to be lapped can be calculated with high accuracy.

When the workpiece has been lapped to the specified position, the end faces of the two marker layers on the lapped surface appear opposed to and in contact with each other at the point of intersection indicating the lapping completion position. This state can be accurately recognized visually.

Further even if the marker is somewhat deformed during lapping, no change occurs in the state of the two marker layers relative to each other in the three stages of lapping, with the result that the operator can accurately recognize each lapping stage.

BRIEF DESCRIPTION OF THE DRAWINGS

FIGS. 10 (a), 10(b) and 10(c) are front views showing changes in the worked surface of the magentic head workpiece with the progress of working;

DETAILED DESCRIPTION OF EMBODIMENTS

Markers of the present invention and a process for producing thin film magnetic heads with use of such markers will be described below with reference to first and second application examples.

First Application Example

Figure 1:
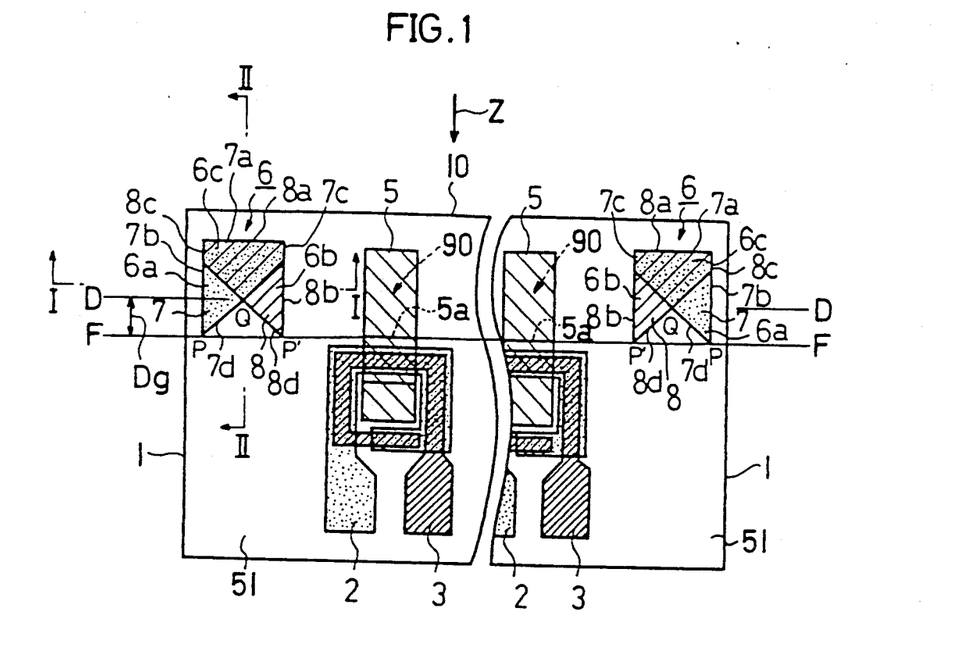
FIG. 1 is a plan view of working amount detecting markers of the invention for use in forming a medium facing surface and a substrate formed with the markers.

FIG. 1 shows a thin film magnetic head assembly which is to be worked, i.e. lapped, according to the invention to obtain a magnetic head. The magnetic head is of the multitrack type comprising a plurality of magnetic head portions arranged widthwise of tracks (sidewise direction in FIG. 1) and each including first and second conductor coil layers 2, 3, an upper magnetic core 5, etc. The assembly is lapped toward the direction Z shown to the position of line D—D, whereby the gap depth Dg of each head portion is given a predetermined value.

Figure 11:
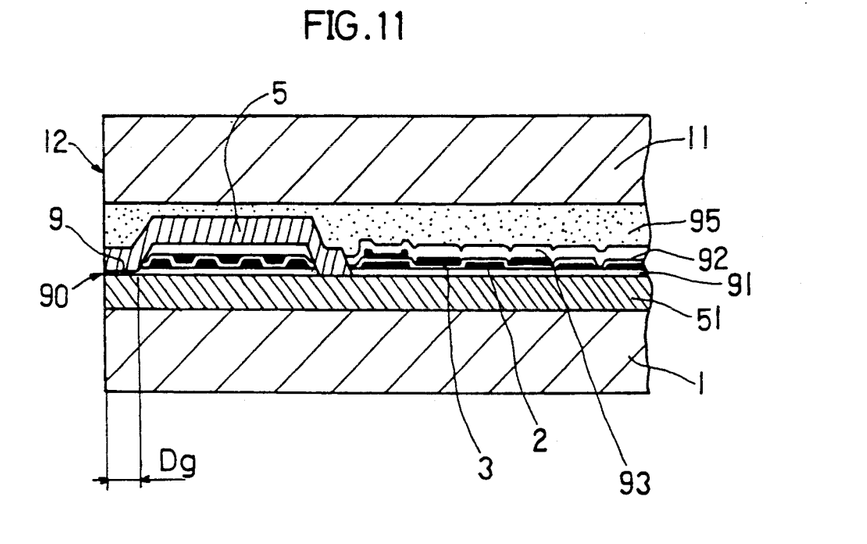
FIG. 11 is a view in vertical section showing a thin film magnetic head.

FIG. 11 shows the construction of the magnetic head portion as completely lapped. Formed on a magnetic or nonmagnetic substrate 1 are a lower magnetic core 51 of Sendust, first insulating layer 91 of $SiO_2$ providing a gap spacer 9, first conductor coil layer 2 of Cu, second insulating layer 92 of $SiO_2$, second conductor coil layer 3 of Cu, third insulating layer 93 of $SiO_2$ and upper magnetic core 5 of Sendust, these components being superposed one over another.

A protective plate 11 of nonmagnetic ceramic is provided over the upper surface of the above structure with a bonding layer 95 of glass or synthetic resin interposed therebetween.

The gap spacer 9 sandwiched between the lower and upper magnetic cores 51 and 5 is left exposed at the surface 12 to be opposed to the magnetic medium and formed by lapping to form a magnetic gap having the predetermined depth Dg.

As seen in FIG. 1, a pair of markers 6, 6 of Cu for detecting the amount of working are formed on the substrate 1 at the respective lateral ends thereof.

Figure 3A:
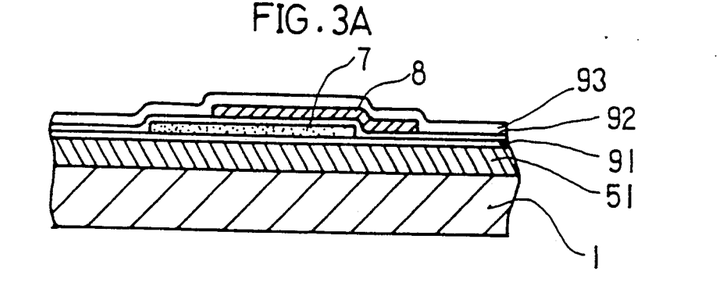
FIG. 3A is an enlarged view in section taken along the line I—I in FIG. 1.
Figure 3B:
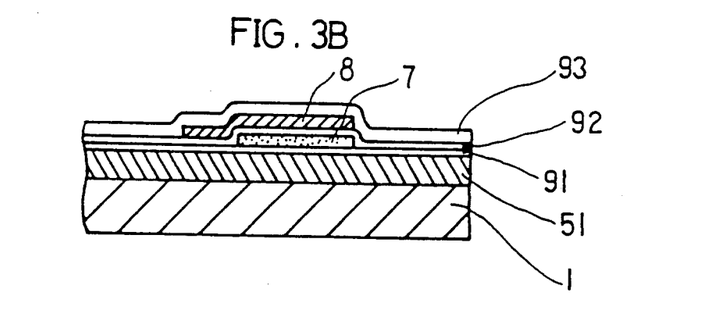
FIG. 3B is an enlarged view in section taken along the line II—II in FIG. 1.

As illustrated, each of the markers 6 comprises a first marker layer 7 and a second marker layer 8 superposed over the layer 7. These layers each have a trapezoidal contour and are arranged symmetrically of the marker. As shown in FIGS. 3A and 3B, the first marker layer 7 is formed on the upper surface of the lower magnetic core 51, and the second marker layer 8 is formed over the first marker layer 7 with the second insulating layer 92 interposed therebetween.

Figure 2:
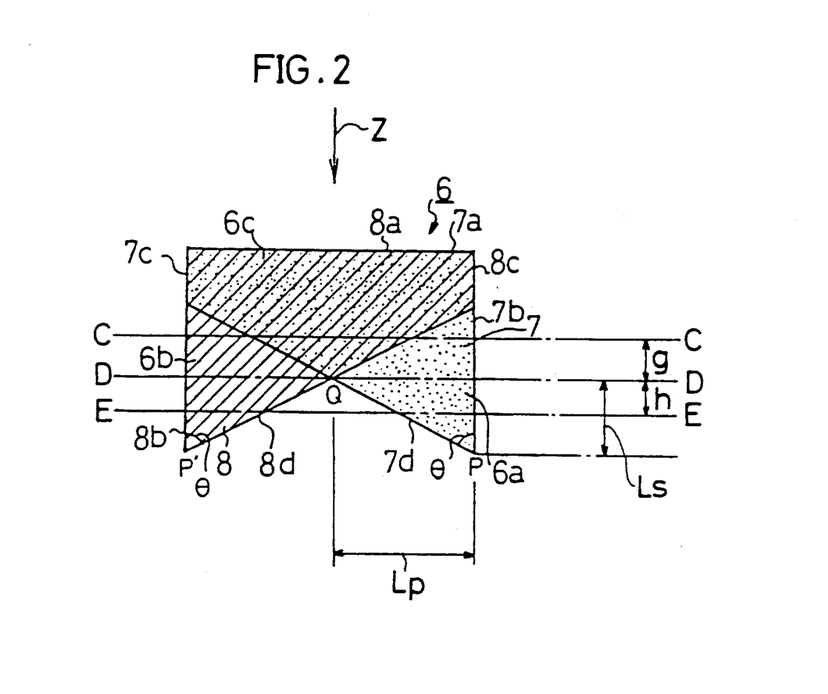
FIG. 2 is an enlarged plan view showing the marker.

With reference to FIGS. 1 and 2, the trapezoidal contour of each of the two marker layers 7, 8 comprises a first side 7a (8a) intersecting the depthwise direction of the gap, i.e. the direction Z of progress of lapping, at right angles therewith, a second side 7b (8b) and a third side 7c (8c) which extend from the respective ends of the first side perpendicular thereto and are different from each other in length, and a fourth side 7d (8d) inclined at a specified angle with respect to the depthwise direction of the gap. The first sides 7a, 8a of the two marker layers 7, 8 are positioned on the same line, and the fourth sides 7d, 8d intersect each other.

Accordingly, the detecting marker 6 has a first detecting portion 6a consisting only of the first marker layer 7, a second detecting portion 6b consisting only of the second marker layer 8, and a third detecting portion 6c consisting of the two layers in superposed relation.

In particular, the third detecting portion 6c is disposed in one of the two areas opposed to each other and along the starting side of the working progress direction Z. Further, a boundary line between the first detecting portion 6a and the third detecting portion 6c is defined by a part of the fourth side 8d of the second marker layer 8. A boundary line between the second detecting portion 6b and the third detecting portion 6c is defined by a part of the fourth side 7d of the first marker layer 7.

As seen in FIG. 1, the point P of intersection of the second side 7b of the first marker layer 7 with the fourth side 7d thereof, and the point P' of intersection of the second side 8b of the second marker layer 8 with the fourth side 8d thereof are positioned on a straight line F—F through the inner ends 5a, 5a of the magnetic gaps, and the point Q of intersection of the fourth sides 7d, 8d is positioned on the line D—D shown in FIG. 2 and indicating the position of completion of lapping. The first marker layer 7 and the second marker layer 8 are arranged symmetrically with respect to a phantom line (not shown) extending through the intersecting point Q and in parallel to the direction Z of progress of working.

In view of ease of the calculation of the gap depth to be described later, the angle Θ of inclination of the fourth sides 7d, 8d is set to about 63 degrees so that the distance Lp from point Q to the second sides 7b, 8b as measured perpendicular thereto will be twice the distance Ls from point Q to points P, P' along the direction Z.

The thin film magnetic head will be produced by the process to be described below with reference to FIGS. 1 and 11.

First, a ferromagnetic metal film as of Sendust is formed by vacuum evaporation or sputtering over the entire area of the upper surface of a substrate 1 made of crystallized glass or like nonmagnetic material, or ferrite or like magnetic material, and the film is then shaped into a predetermined configuration to prepare a lower magnetic core 51. A first insulating layer 91 of SiO$_2$ is then formed over the entire area of the upper surface of the core 51 for each head portion.

A Cu film, 2 μm in thickness, is formed by vacuum evaporation or sputtering over the entire area of the upper surface of the first insulating layer 91 and thereafter subjected to ion beam etching to form a first conductor coil layer 2 and a first marker layer 7 at the same time for each head portion and each marker 6.

Subsequently, a second insulating layer 92 of SiO$_2$ is formed over the entire resulting surface of the substrate to a thickness of 1 μm, and a Cu film having a thickness of 2 μm is formed over the entire surface of the layer 92 by vacuum evaporation or sputtering and then subjected to ion beam etching to form a second conductor coil layer 3 and a second marker layer 8 at the same time.

A magnetic head assembly is obtained by thereafter forming a third insulating layer 93 of SiO$_2$ and an upper magnetic core 5 over the resulting surface as already known and joining a protective plate 11 to the core surface with a bonding layer 95.

Finally, an end face 10 of the magnetic head assembly is lapped with a known tapelike lapping tool to form the surface 12 to be opposed to magnetic recording media (medium facing surface), whereby a thin film magnetic head is completed which has a predetermined gap depth Dg.

The assembly is progressively lapped while observing as by a magnifying glass the configuration of the end faces of the detecting markers 6, 6 appearing on the lapped surface.

Figures 4, 4A, 4B, 4C:
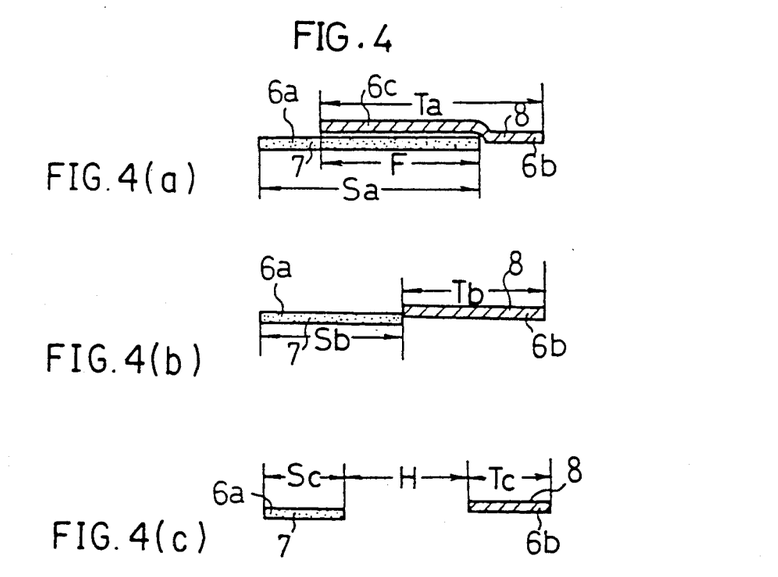
FIGS. 4(a), 4(b) and 4(c) are front views showing the end face of the marker appearing on the worked surface with the progress of working.

Stated more specifically, when the assembly has been ground to the line C—C in FIG. 2, the first detecting portion 6a of first marker layer 7 only, the third detecting portion 6c of superposed first and second marker layers 7, 8 and the second detecting portion 6b of second marker layer 8 only are observed on the lapped surface as shown in FIG. 4(a), indicating that the assembly has not been lapped to the specified position.

The amount of working done until this time since the start of lapping can be calculated by measuring the width Sa of the first marker layer 7 and the width Ta of the second marker layer 8. The errors in the measurements due to the deformation of the marker films 7, 8 can be offset by taking an average of the two measurements Sa, Ta. Furthermore, the amount g remaining to be ground and shown in FIG. 2 can be readily determined from the relationship g=F/4 wherein F is the width measured of the third detecting portion 6c.

When the lapped surface inclines, a difference occurs between the two measurements, so that the inclination can be corrected based on the difference.

When the assembly is thereafter lapped to the line D—D in FIG. 2, the third detecting portion 6c disappears from the lapped surface, and the first detecting portion 6a and the second detecting portion 6b are found butting against each other at one point as shown in FIG. 4(b) indicating that the predetermined gap depth is obtained. Even if the marker layers 7, 8 are deformed by lapping at this time, the two marker layers remain butting against each other, with the result that the operator can accurately recognize when to discontinue the lapping operation.

The gap depth Dg obtained can be calculated from the widths Sb, Tb measured of the first detecting portion 6a and the second detecting portion 6b. For example when there is no difference between the two measurements, the depth can be determined from the relation of Dg=Sb/2.

Grinding is completed when the above condition is reached, whereas if the assembly is further lapped to the line E—E in FIG. 2 depending, for example, on the lapping condition, or if the medium facing surface of the finished magnetic head is worn after it has been used as installed in a recording-reproduction apparatus for a long period of time, the first detecting portion 6a and the second detecting portion 6b are observed as spaced apart from each other in the lapped surface or the medium facing surface as shown in FIG. 4(c), indicating that the gap depth is less than the predetermined value. The excessive amount of lapping or the amount of wear of the head can be calculated from the widths Sc, Tc measured of the first detecting portion 6a and the second detecting portion 6b, or from the measurement of the distance H between the two detecting portions. For example, the excessive amount of lapping, h, shown in FIG. 2 can be determined from the relationship h=H/4.

Figure 5:
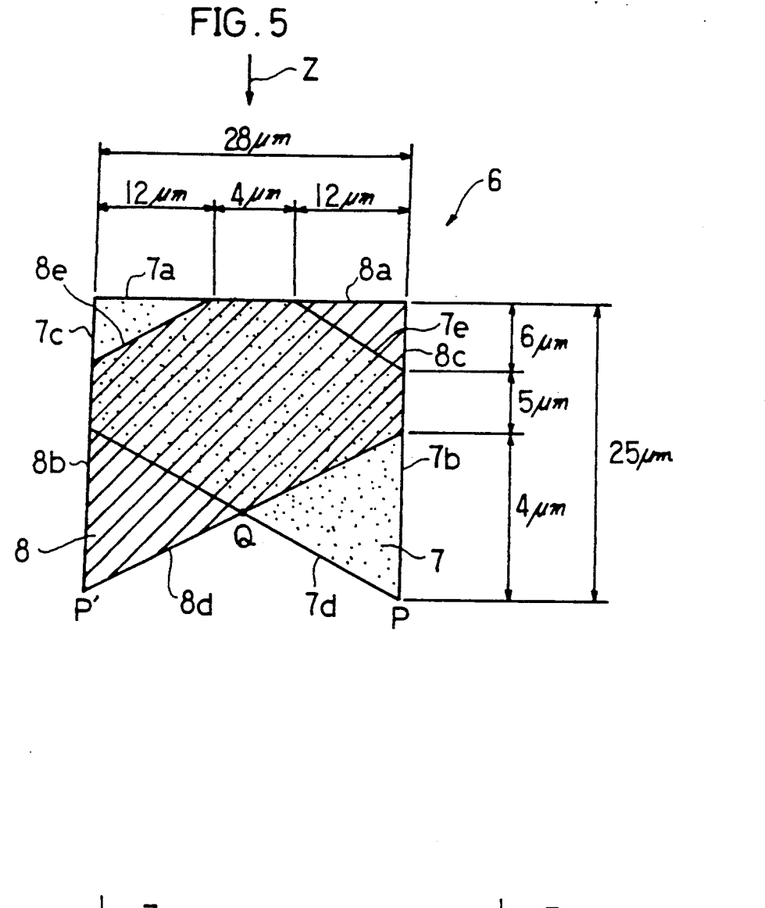
FIG. 5 is a plan view showing another marker embodying the invention.

FIG. 5 shows a marker 6 of different construction, in which the first marker layer 7 and the second marker layer 8 are formed in their ends opposed to the direction of progress of lapping with fifth sides 7e, 8e parallel to the fourth sides 7d, 8d, respectively. Thus, the marker layers have a pentagonal contour. The drawing shows the dimensions of the markers 6.

Using the detecting marker of FIG. 5, the amount remaining to be lapped can be calculated in the initial stage of lapping after the workpiece has been lapped to such an extent that the lapped surface intersects the fifth sides 7e, 8e.

Figure 6A:
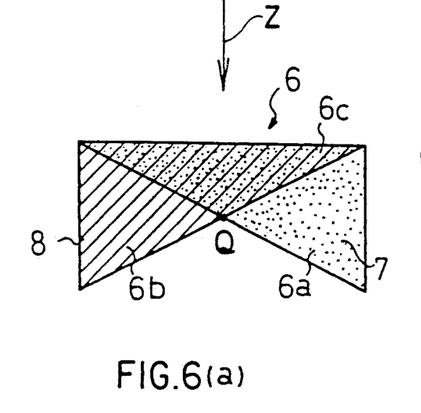
FIGS. 6(a) and 6(b) are plan views showing other embodiments.
Figure 6B:
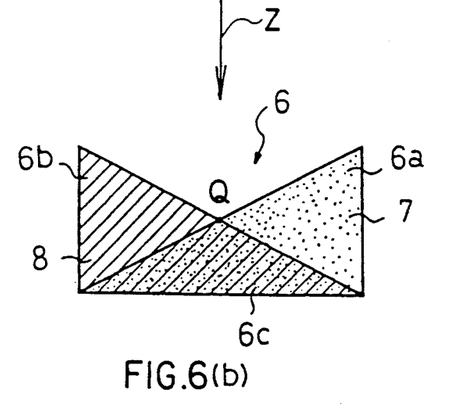

Further with reference to FIGS. 6(a) and (b), the third detecting portion 6c affords the same effect regardless of whether it is positioned upstream or downstream from point Q with respect to the direction of progress of lapping, Z.

The feature that the stage of progress of working can be detected only with reference to the pattern of end face of the marker appearing on the worked surface is not only useful for the lapping method resorting to visual perception but also makes it possible to automatically lap workpieces to obtain a predetermined gap depth using an automatic lapping machined having a pattern recognition function.

Second Application Example

Figure 8:
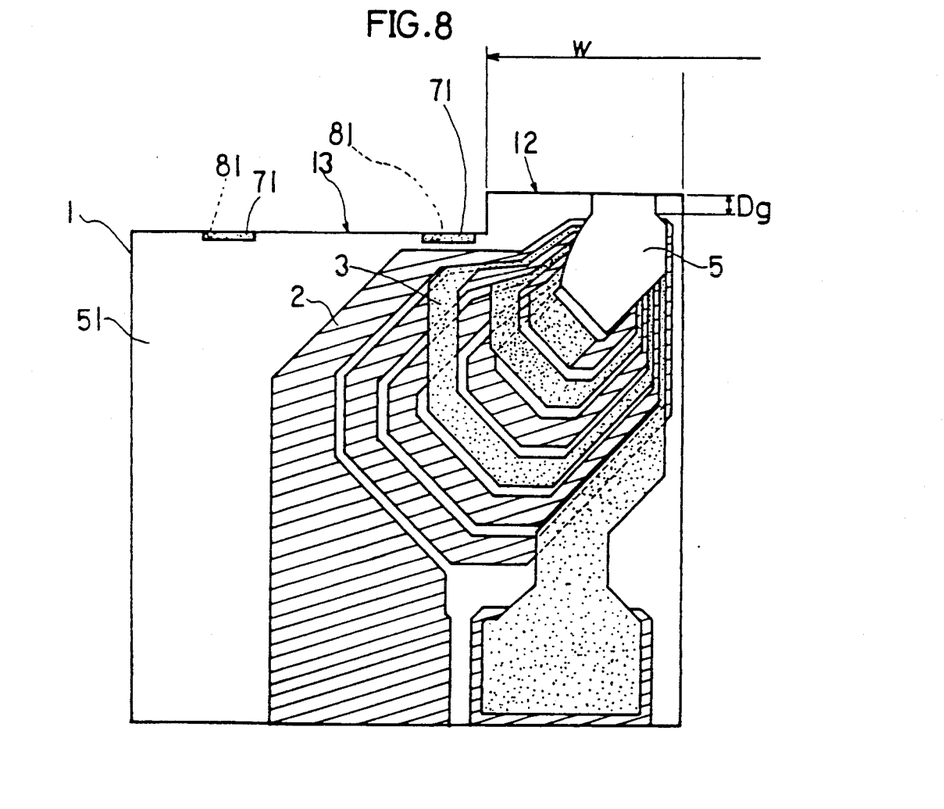
FIG. 8 is a plan view showing the markers and the substrate of FIG. 7 after the substrate has been worked.

While detecting markers of the invention are used for lapping the medium facing surface 12 according to the first application example, the markers of the second application example are suitable for detecting the depth to which a flank 13 is to be grooved to determine the width W of the medium facing surface 12 in the direction of width of tracks as seen in FIG. 8.

Figure 7:
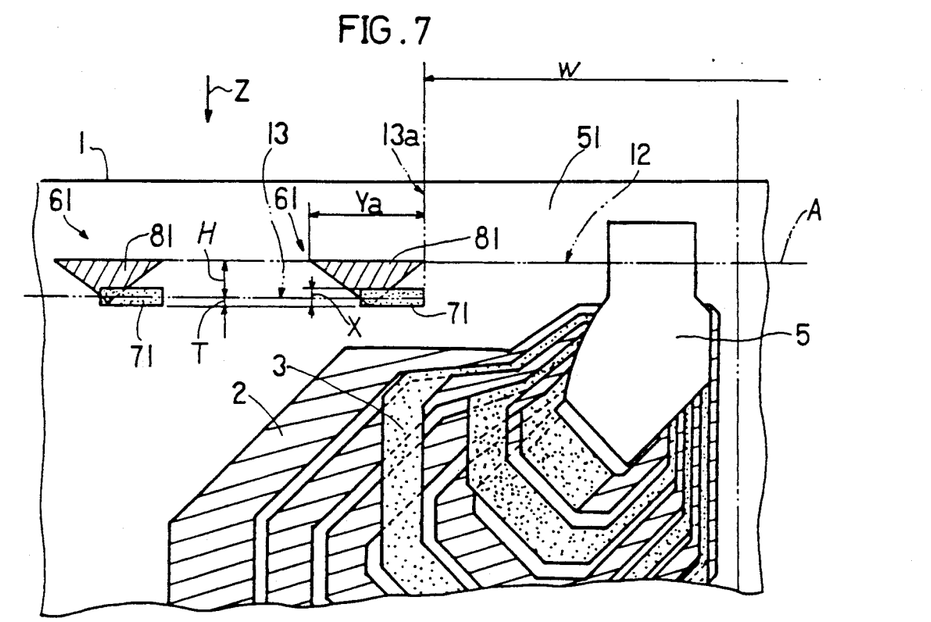
FIG. 7 is a plan view of working amount detecting markers of the invention for use in working to define the width of the medium facing surface and a substrate formed with the markers.

With reference to FIG. 7, the substrate 1 to be grooved is provided with a pair of detecting markers 61, 61 embodying the invention. Each of the markers 61, 61 comprises a rectangular first marker film 71 elongated in a direction perpendicular to the direction Z of progress of grooving, and a second marker film 81 in the form of a rectangular equilateral triangle with a base in parallel to the length of the first marker film 71, with the film 71 laminating the film 81.

The width Ya of the base of the second marker film 81 and the height H+T thereof have the relationship of Ya=2(H+T). The base is in alignment with the medium facing surface 12 as indicated at A. One end of the base of the right marker film 81 shown in FIG. 7 is in coincidence with a side face 13a of the flank 13 immediately adjacent to the medium facing surface 12. The vertex of the film 81 is positioned in coincidence with the long side of the first marker film 71 which side is closer to the first conductor coil layer 2.

On the other hand, the length X of the short side of the rectangular first marker film 71 corresponds to twice (10 μm) the grooving tolerance T (5 μm) of the flank 13, and the longitudinal center line of the film 71 is positioned at the depth of the flank 13.

Figure 10A:
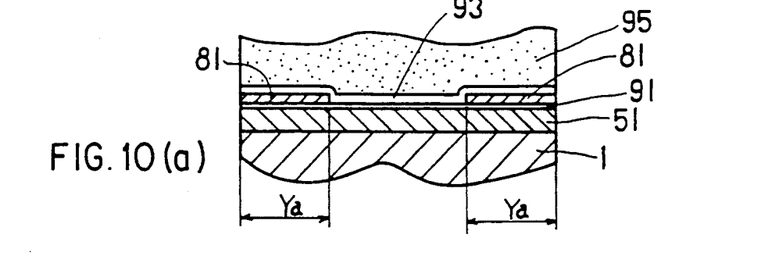
Figure 10B:
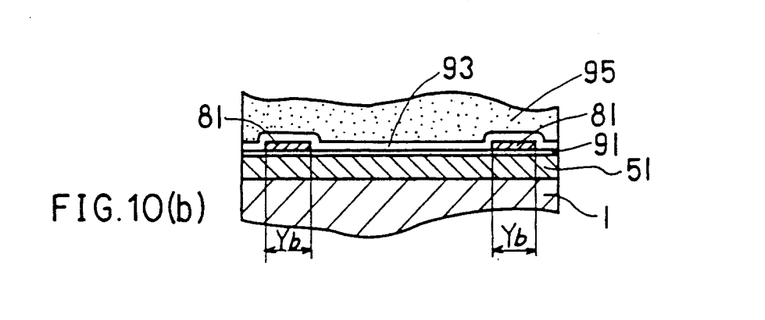
Figure 10C:
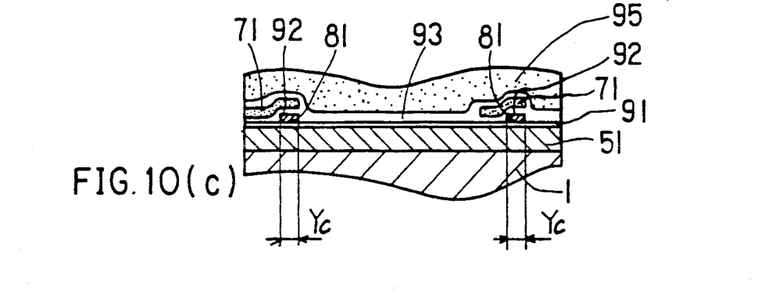

FIGS. 10(a), (b) and (c) show changes in the configuration of end faces of the first and second marker films 71, 81 appearing on the ground surface as the head assembly is grooved to an increasing depth to form the flank 13.

When the second marker films 81 only appear on the ground surface with the width Ya as shown in FIG. 10(a), this indicates that the assembly has been grooved to the position of the line A in FIG. 7. Accordingly, the assembly needs to be subsequently grooved over a distance H (H=Ya/2−T) as shown in FIG. 7, whereby the flank 13 can be formed at a predetermined depth.

When the second marker films 81 only are observed with a width Yb (Yb<Ya) as seen in FIG. 10(b), the assembly needs to be further grooved by Yb/2−T.

In the case where the second marker films 81 appear with a width Yc (Yc<Yb), with the first marker films 71 also observed as shown in FIG. 10(c), these films indicate that the flank 13 has been formed within the tolernace (±T).

In this case, the grooving error can be calculated from Yc/2−T, so that when the next magnetic head assembly is to be grooved, the depth to which it is grooved is corrected by the amount corresponding to the error. This results in an improved yield.

Figure 9:
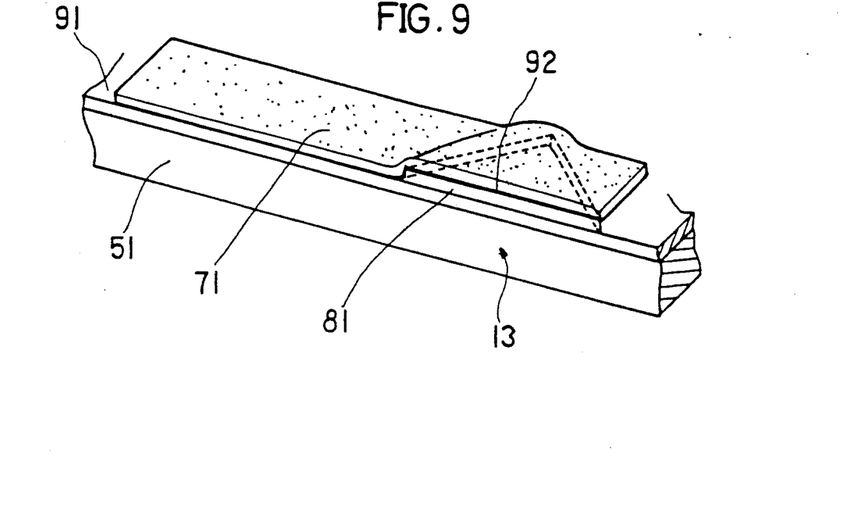
FIG. 9 is an enlarged perspective view showing the marker of FIG. 8 after working.

With reference to FIGS. 8 and 9, the magnetic head obtained by the grooving operation has a pair of strip-like first marker films 71 above the upper surface of the first insulating layer 91 on the lower magnetic core 51, with the outer long sides of the films 71 in alignment with the flank 13. Further formed between the first insulating layer 91 and the first marker films 71 are a pair of triangular second marker films 81 having their bases positioned in alignment with the flank 13 and their vertexes positioned under the inner long sides of the respective first marker films 71.

With the use of the detecting marker 61, the first marker 71 appearing on the ground surface visually indicates that the workpiece has been grooved to a depth within the tolerance, and the grooving operation can be conducted with high accuracy with reference to the width measured of the second marker film 81.

The present invention is not limited to the foregoing embodiments, but various modifications can of course be made by one skilled in the art without departing from the scope of the invention as defined in the appended claims.

For example, although the pair of detecting markers 6, 6 have been described, the advantages of the invention can be obtained similarly also by using only one of these markers 6.

What is claimed is:

1. A working amount detecting marker for detecting a worked condition of a thin film laminated structure formed by a machining process that removes material from a worked edge portion of said laminated structure in a direction of working perpendicular to said worked edge, said marker comprising:

a first marker layer and a second marker layer each having a predetermined shape when seen in a plan view, said layers being partially superimposed to form a pattern comprising at least a first detecting portion consisting only of the first marker layer, a second detecting portion consisting only of the second marker layer and a third detecting portion consisting of both superimposed layers:

said first and second marker layers each being contoured to have a plurality of sides, one of the two marker layers including a side inclined at a predetermined angle to said direction of working so as to intersect a side of another one of the two marker layers at a point in a plan view, a portion of each of the two intersecting sides forming a boundary line between said third detecting portion and said first and second detecting portions, respectively;

the point of intersection of the sides being located at a predetermined position of the laminated structure so as to indicate, by inspection of said marker layers at said worked edge, a position where working is to be completed.

2. A marker as defined in claim 1, wherein the two intersecting sides are both inclined with respect to said direction of working, said intersecting sides define four areas around the point of intersection, and said third detecting portion is disposed in one of two such areas opposed to each other in the direction of working.

3. A marker as defined in claim 1 wherein the first marker layer and the second marker layer are arranged symmetrically with respect to a phantom line extending through the point of intersection and in parallel to the direction of progress of working.

4. A marker as defined in claim 1 wherein the first marker layer and the second marker layer are made of an electrically conductive material, and an insulating layer is interposed between the two marker layers.

* * * * *